(12) United States Patent
Kim

(10) Patent No.: US 11,221,700 B2
(45) Date of Patent: Jan. 11, 2022

(54) TOUCH CIRCUIT, TOUCH DISPLAY DEVICE AND DRIVING METHOD THEREOF

(71) Applicant: LG Display Co., Ltd., Seoul (KR)

(72) Inventor: Taehyung Kim, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 146 days.

(21) Appl. No.: 16/719,441

(22) Filed: Dec. 18, 2019

(65) Prior Publication Data

US 2020/0210009 A1 Jul. 2, 2020

(30) Foreign Application Priority Data

Dec. 26, 2018 (KR) .................. 10-2018-0169468

(51) Int. Cl.
*G06F 3/041* (2006.01)
*G06F 3/047* (2006.01)
*G09G 3/3291* (2016.01)

(52) U.S. Cl.
CPC ............ *G06F 3/0412* (2013.01); *G06F 3/047* (2013.01); *G09G 3/3291* (2013.01); *G09G 2310/0264* (2013.01)

(58) Field of Classification Search
None
See application file for complete search history.

(56) References Cited

U.S. PATENT DOCUMENTS

| | | | | |
|---|---|---|---|---|
| 2012/0256869 A1* | 10/2012 | Walsh | ............... | G06F 3/044 345/174 |
| 2013/0278538 A1 | 10/2013 | Brunet et al. | | |
| 2016/0019827 A1* | 1/2016 | Lee | ............... | G06F 3/0412 345/204 |
| 2016/0054829 A1* | 2/2016 | Ellis | ............... | G06F 3/0446 345/178 |
| 2016/0188115 A1* | 6/2016 | Seo | ............... | G06F 3/0412 345/173 |
| 2016/0216836 A1* | 7/2016 | Yao | ............... | G06F 3/041661 |
| 2016/0357299 A1* | 12/2016 | Liu | ............... | G06F 3/0443 |
| 2017/0068384 A1* | 3/2017 | Kim | ............... | G06F 3/04166 |
| 2017/0102824 A1* | 4/2017 | Kang | ............... | G06F 3/04184 |
| 2017/0102825 A1* | 4/2017 | Kim | ............... | G02F 1/13338 |
| 2017/0192603 A1 | 7/2017 | Takanohashi | | |
| 2017/0220183 A1* | 8/2017 | Kim | ............... | G06F 3/04166 |

(Continued)

FOREIGN PATENT DOCUMENTS

CN 101739182 A 6/2010
CN 103593097 A 2/2014

(Continued)

*Primary Examiner* — Patrick N Edouard
*Assistant Examiner* — Peijie Shen
(74) *Attorney, Agent, or Firm* — Birch, Stewart, Kolasch & Birch, LLP

(57) ABSTRACT

A touch display device and a driving method thereof are discussed. The touch display device can include a display panel, a plurality of touch electrodes that are arranged in the display panel, and a plurality of touch circuits that are connected to the plurality of touch electrodes and are supplied with a load-free driving signal. Each touch circuit stores an offset voltage of the touch circuit, is supplied with the load-free driving signal from the touch electrode, corrects the load-free driving signal on the basis of the offset voltage, and outputs the corrected load-free driving signal.

13 Claims, 12 Drawing Sheets

(56) References Cited

U.S. PATENT DOCUMENTS

| | | | |
|---|---|---|---|
| 2017/0300165 A1* | 10/2017 | Shin | G06F 3/04166 |
| 2017/0344787 A1* | 11/2017 | Cho | G06F 3/0443 |
| 2018/0275823 A1* | 9/2018 | Lim | G06F 3/0418 |
| 2019/0050617 A1* | 2/2019 | Li | G06F 3/0416 |
| 2019/0294297 A1* | 9/2019 | Sasai | G06F 3/041 |

FOREIGN PATENT DOCUMENTS

| | | |
|---|---|---|
| CN | 104199581 A | 12/2014 |
| CN | 102236489 B | 6/2016 |
| CN | 106445262 A | 2/2017 |
| CN | 104769536 B | 7/2017 |
| CN | 107092407 A | 8/2017 |
| CN | 107977107 A | 5/2018 |
| JP | 2313-88383 A | 5/2013 |
| JP | 2315-60186 A | 3/2015 |
| JP | 2315-24805 A | 2/2016 |
| JP | 2018-5916 A | 1/2018 |
| JP | 2018-529136 A | 10/2018 |

* cited by examiner

TOUCH CIRCUIT, TOUCH DISPLAY DEVICE AND DRIVING METHOD THEREOF

CROSS REFERENCE TO RELATED APPLICATION

This application claims priority to Korean Patent Application No. 10-2018-0169468, filed in the Republic of Korea on Dec. 26, 2018, which is hereby incorporated by reference for all purposes as if fully set forth herein.

BACKGROUND

Field of the Invention

Embodiments of the present disclosure relate to a touch display device and a driving method thereof.

Discussion of the Related Art

With advancement in information-oriented societies, demands for display devices that display an image have increased in various types, and various types of display devices such as a liquid crystal display (LCD) device, a plasma display panel (PDP) device, and an organic light-emitting display (OLED) device have been provided.

Such display devices provide a touch-based input system enabling a user to easily, intuitively, and conveniently input information or commands instead of normal input systems using buttons, a keyboard, a mouse, and the like. A display device that provides a touch-based input system is referred to as a touch display device. Touch display devices employ a capacitance touch system in which a plurality of touch electrodes (for example, horizontal electrodes and vertical electrodes) are formed on a display panel and whether a touch, touch coordinates, and the like are detected on the basis of a change in the capacitance between the touch electrodes or a change in the capacitance between the touch electrodes and a pointer such as a finger. When a touch can be accurately detected, a touch display device can detect a fine touch and such a touch input can be applied to various applications. Accordingly, a touch display device has to determine whether there is a touch and accurately detect touch coordinates and a touch strength.

SUMMARY

An objective of the embodiments of the present disclosure is to provide a touch display device that can accurately detect a touch and a driving method thereof.

Another objective of the embodiments of the present disclosure is to provide a touch display device that can be applied to various applications and a driving method thereof.

According to an aspect of the present disclosure, there is provided a touch display device including a display panel; a plurality of touch electrodes that are arranged in the display panel; and a plurality of touch circuits that are connected to the plurality of touch electrodes and are supplied with a load-free driving signal. Each touch circuit stores an offset voltage of the touch circuit, is supplied with the load-free driving signal from the touch electrode, corrects the load-free driving signal on the basis of the offset voltage, and outputs the corrected load-free driving signal.

According to another aspect of the present disclosure, there is provided a touch circuit including a comparator that generates an output voltage on the basis of an input voltage and compares the input voltage with the output voltage; a storage unit that stores an offset voltage which corresponds to a voltage difference between the input voltage and the output voltage which is output from the comparator; and a switch unit that corrects the input voltage on the basis of the offset voltage stored in the storage unit.

According to still another aspect of the present disclosure, there is provided a method of driving a touch display device including a plurality of touch circuits that are connected to a plurality of touch lines and output a touch sensing signal thereto, the method including sensing an offset voltage of the plurality of touch circuits; storing the sensed offset voltage in the touch circuits; and sensing a touch and correcting charged voltages of the touch electrodes input to the touch circuits on the basis of the stored offset voltage.

According to embodiments of the present disclosure, it is possible to provide a touch display device that can accurately detect a touch and a driving method thereof.

According to embodiments of the present disclosure, it is possible to provide a touch display device that can be applied to various applications and a driving method thereof.

DETAILED DESCRIPTION OF THE EMBODIMENTS

Figure 1:
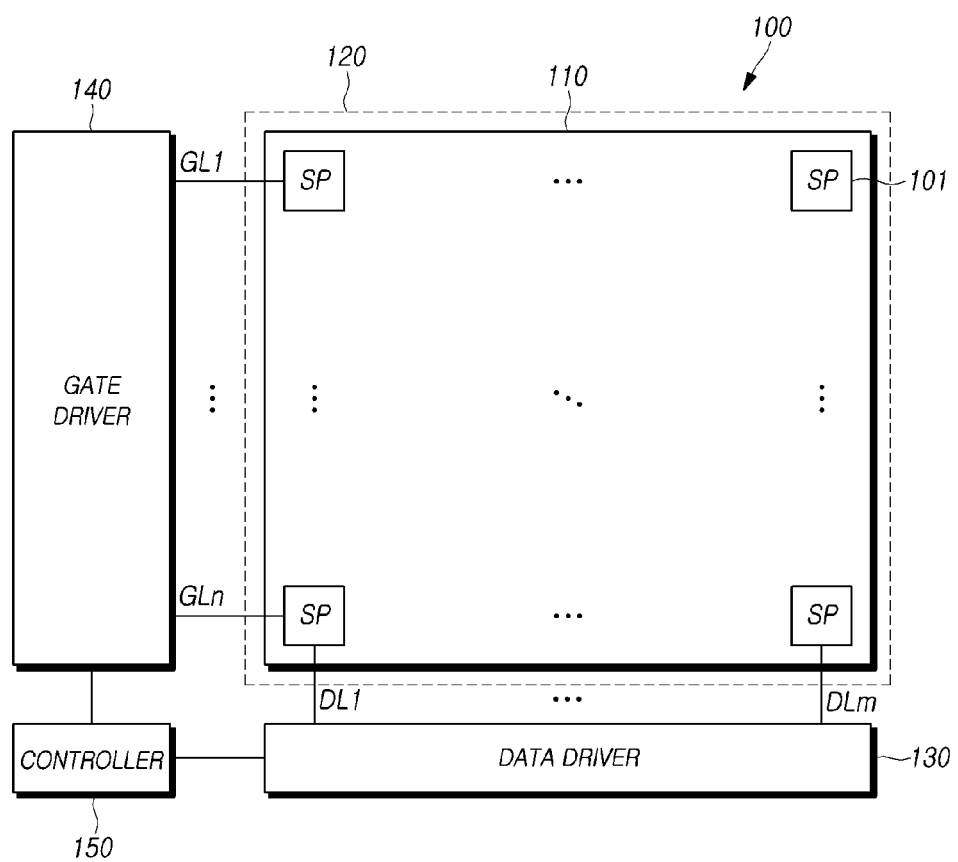
FIG. 1 is a diagram illustrating a configuration of a touch display device according to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it can make the subject matter of the present disclosure rather unclear.

In addition, terms, such as first, second, A, B, (a), (b) or the like can be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is bonded with" another structural element, it should be interpreted that another structural element can "be connected to", "be coupled to", or "be in contact with" the structural elements as well as that the certain structural element is directly connected to or is in direct contact with another structural element.

FIG. 1 is a diagram illustrating a configuration of a touch display device according to embodiments of the present disclosure. All the components of the touch display device according to all embodiments of the present disclosure are operatively coupled and configured.

Referring to FIG. 1, a touch display device 100 includes a display panel 110, a data driver 130, a gate driver 140, a touch sensor 120, and a controller 150.

In the display panel 110, a plurality of gate lines GL1, ..., GLn and a plurality of data lines DL1, ..., DLm are arranged to cross each other. The display panel 110 further includes a plurality of subpixels (SP) 101 which are formed to correspond to areas in which the plurality of gate lines GL1, ..., GLn and the plurality of data lines DL1, ..., DLm cross each other. The plurality of subpixels 101 include subpixels that emit red light, subpixels that emit green light, subpixels that emit blue light, and subpixels that emit white light. Colors of light which is emitted from the subpixels 101 are not limited thereto and other variations are possible.

Lines which are disposed in the display panel 110 are not limited to the plurality of gate lines GL1, ..., GLn and the plurality of data lines DL1, ..., DLm.

The touch sensor 120 outputs a touch sensing signal in response to a touch of the display panel 110. Here, a touch includes a direct touch of the display panel 110 with a touch object such as a finger or a pen and an approach therebetween within a predetermined distance. The touch sensor 120 includes a plurality of touch electrodes and a touch circuit that processes touch signals output from the touch electrodes. The touch signals can include a touch driving signal and a touch sensing signal.

The touch circuit senses a touch sensing signal which is transmitted in response to a touch driving signal applied to the corresponding touch electrode and outputs a voltage or a current corresponding to the touch sensing signal. The touch sensor 120 includes touch lines that connect the touch electrodes to the touch circuit. The touch sensor senses change of a voltage charged in the touch electrodes and outputs a signal corresponding to the charged voltage. In the touch sensor 120, each touch electrode is supplied with the touch driving signal, is charged with a predetermined voltage, and outputs a touch sensing signal to correspond to the charged voltage. The touch circuit can be embodied as an integrated circuit.

The data driver 130 supplies data signals to the plurality of data lines DL1, ..., DLm. The data signals correspond to gray scales and a voltage level of a data signal is determined on the basis of the corresponding gray scale. A voltage of a data signal is referred to as a data voltage.

The number of data drivers 130 is illustrated to be one in the drawing, but the present disclosure is not limited thereto. The number of data drivers 130 can be two or more to correspond to a resolution. The data driver 130 can be embodied as an integrated circuit.

The gate driver 140 supplies gate signals to the plurality of gate lines GL1, ..., GLn. The subpixels 101 corresponding to the plurality of gate lines GL1, ..., GLn to which the gate signals have been supplied can be supplied with the data signals. The gate driver 140 supply a sensing signal to the subpixels 101. A subpixel 101 to which the sensing signal output from the gate driver 140 is supplied can be supplied with the sensing voltage output from the data driver 130. Here, the number of gate drivers 140 is illustrated to be one in the drawing, but the present disclosure is not limited thereto. The number of gate drivers 140 can be two or more.

The gate drivers 140 can be disposed on both sides of the display panel 110. One gate driver 140 can be connected to odd-numbered gate lines out of the plurality of gate lines GL1, ..., GLn and the other gate driver 140 can be connected to even-numbered gate lines out of the plurality of gate lines GL1, ..., GLn. The present disclosure is not limited thereto. Each gate driver 140 can be embodied as an integrated circuit. Each gate driver 140 includes a gate signal generating circuit and a level shifter that supplies a signal and/or a voltage to the gate signal generating circuit. The gate signal generating circuit of the gate driver 140 can be disposed on the display panel 110.

The controller 150 controls the touch sensor 120. The controller 150 can supply a touch driving signal to the touch sensor 120 and can detect a position of a touch point on the basis of a touch sensing signal corresponding to the touch driving signal supplied thereto. The controller 150 controls the data driver 130 and the gate driver 140.

The controller 150 supplies an image signal corresponding to a data signal to the data driver 130. The image signal can be a digital signal. The controller 150 corrects the image signal and supplies the corrected image signal to the data driver 130. The operation of the controller 150 is not limited thereto. The controller 150 can include a touch control circuit. The controller 150 can include a timing controller. The touch control circuit controls the touch sensor and the timing controller controls the data driver 130 and the gate driver 140. However, the configuration of the controller 150 is not limited thereto. The controller 150 can be embodied as an integrated circuit.

Figure 2:
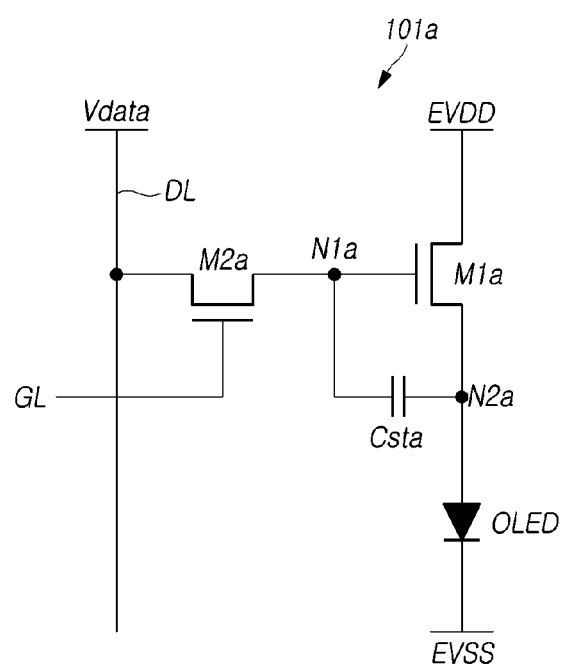
FIG. 2 is a circuit diagram illustrating a first example of a subpixel illustrated in FIG. 1.

FIG. 2 is a circuit diagram illustrating a first example of a subpixel illustrated in FIG. 1.

Referring to FIG. 2, a subpixel 101a of the plurality of subpixels (SP) 101 includes an organic light emitting diode OLED and a subpixel circuit. The subpixel circuit includes a first transistor M1a that supplies a driving current to correspond to the data signal, a second transistor M2a that supplies a data signal to the first transistor M1a to correspond to a gate signal, and a storage capacitor Csta that stores the data signal. The organic light emitting diode OLED is supplied with the driving current from the first transistor M1a and emits light.

In the first transistor M1a, a gate electrode is connected to a first node N1a, a first electrode is connected to a first power source EVDD, and a second electrode is connected to a second node N2a. In the second transistor M2a, a gate electrode is connected to the corresponding gate line GL, a first electrode is connected to the corresponding data line DL, and a second electrode is connected to the first node N1a. In the storage capacitor Csta, a first electrode is connected to the first node N1a and a second electrode is connected to the second node N2a. In the organic light emitting diode OLED, an anode electrode is connected to the second node N2a and a cathode electrode is connected to a second power source EVSS. The first transistor M1a supplies a driving current to the second node N2a to correspond to a data voltage Vdata corresponding to the data signal supplied to the first node N1a.

The second transistor M2a supplies a data signal to the first node N1a in response to the gate signal supplied to the corresponding gate line GL. The storage capacitor Csta stores a voltage between the first node N1a and the second node N2a and holds a voltage between the gate electrode and the second electrode of the first transistor M1a to enable a driving current to flow therein. The organic light emitting diode OLED emits light in response to a driving current supplied from the second node N2a. In the organic light emitting diode OLED, an anode electrode is connected to the second node N2a and a cathode electrode is connected to the second power source EVSS. Here, a voltage which is supplied to the cathode electrode is referred to as a cathode voltage.

Figure 3:
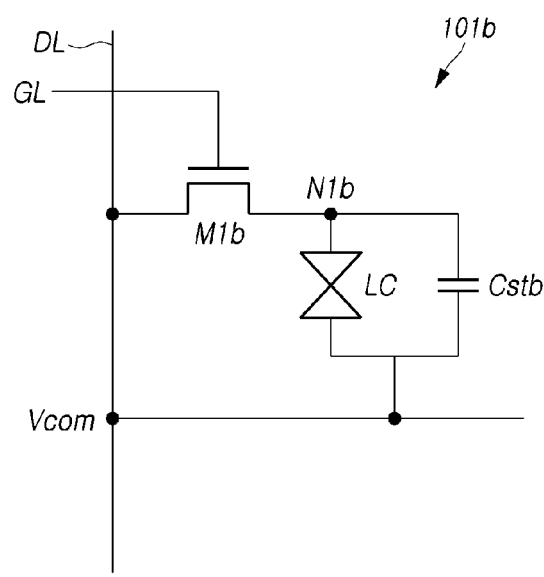
FIG. 3 is a circuit diagram illustrating a second example of a subpixel illustrated in FIG. 1.

FIG. 3 is a circuit diagram illustrating a second example of a subpixel illustrated in FIG. 1.

Referring to FIG. 3, a subpixel 101b of the plurality of subpixels (sp) 101 includes a first transistor M1b, a storage capacitor Cstb, and a liquid crystal LC. In the first transistor M1b, a gate electrode is connected to the gate line GL, a first electrode is connected to the data line DL, and a second electrode is connected to a first node N1b. In the storage capacitor Cstb, a first electrode is connected to the first node N1b and a second electrode is connected to a power supply line that supplies a common voltage Vcom. The first electrode of the storage capacitor Cstb is referred to as a pixel electrode and the second electrode of the storage capacitor Cstb is referred to as a common electrode. The liquid crystal LC is connected in parallel to the storage capacitor Cstb. Accordingly, the liquid crystal LC operates on the basis of a voltage between the pixel electrode and the common electrode. The first transistor M1b supplies a data signal, which is supplied to the data line DL in response to the gate signal supplied via the gate line GL, to the first node N1b. The data signal supplied to the first node N1b is held by the storage capacitor Cstb, and the liquid crystal LC operates to correspond to the data signal.

Figure 4:
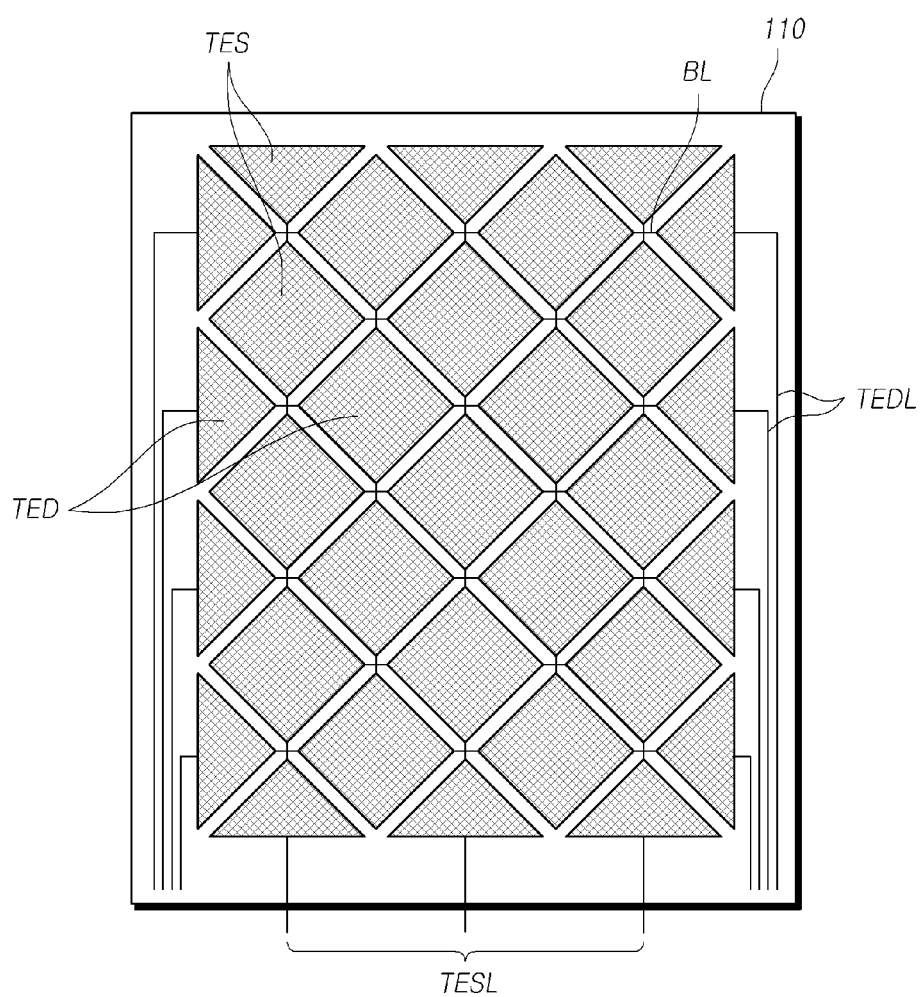
FIG. 4 is a plan view illustrating a touch sensor unit which is employed by the touch display device according to the embodiments of the present disclosure.

FIG. 4 is a plan view illustrating a touch sensor unit which is employed by the touch display device according to the embodiments of the present disclosure.

Referring to FIG. 4, touch electrodes are arranged on the display panel 110 and include a plurality of first touch electrodes TED and a plurality of second touch electrodes TES. The plurality of first touch electrodes TED are referred to as touch driving electrodes and the plurality of second touch electrodes TES are referred to as touch sensing electrodes. The plurality of first touch electrodes TED are connected in a row direction by connection portions BL to form a plurality of electrode rows, and the plurality of second touch electrodes TES are connected in a column direction by connection portions BL to form a plurality of electrode columns. Here, the plurality of first touch electrodes TED and the plurality of second touch electrodes TES are arranged in a 4×3 matrix, but the present disclosure is not limited thereto.

The first touch electrodes TED are supplied with a touch driving signal, and the second touch electrodes TES supply a touch sensing signal corresponding to the touch driving signal. The first touch electrodes TED and the second touch electrodes TES are formed in the same layer on the display panel 110. However, the present disclosure is not limited thereto.

Each connection portion BL connects one first touch electrode TED to another first touch electrode TED. Each connection portion BL connects one second touch electrode TES to another second touch electrode TES. The connection portions BL cross each other. In order to prevent the first touch electrodes TED and the second touch electrodes TES from being directly connected to each other, the connection portions BL connecting the first touch electrodes TED are formed in a layer different from that of the first touch electrodes TED and the second touch electrodes TES and the connection portions BL are connected to the first touch electrodes TED via via-holes. The connection portions BL connecting the second touch electrodes TES are formed in the same layer as the first touch electrodes TED and the second touch electrodes TES and connect the second touch electrodes TES. Accordingly, an insulating film is disposed between the connection portions BL connecting the first touch electrodes TED and the connection portions BL connecting the second touch electrodes TES.

The first touch electrodes TED and the second touch electrodes TES are formed by patterning a metal layer having conductivity. The first touch electrodes TED and the second touch electrodes TES are formed of a transparent material such as indium tin oxide (ITO). The patterned first touch electrodes TED and the patterned second touch electrodes TES include electrode patterns which are formed in a meshes, and the first touch electrodes TED and the second touch electrodes TES include a plurality of openings. Light which is discharged from the display device is discharged to the outside via the first touch electrodes TED and the second touch electrodes TES formed of ITO electrodes or the plurality of openings included in the first touch electrodes TED and the second touch electrodes.

The patterns of the first touch electrodes TED and the second touch electrodes TES which are formed in meshes are referred to as touch electrode lines. The first touch electrodes TED are connected to touch driving lines TEDL that supply a touch driving signal to the touch electrodes TED, and the second touch electrodes TES are connected to touch sensing lines TESL that supply a touch sensing signal generated in response to the touch driving signal.

Figure 5:
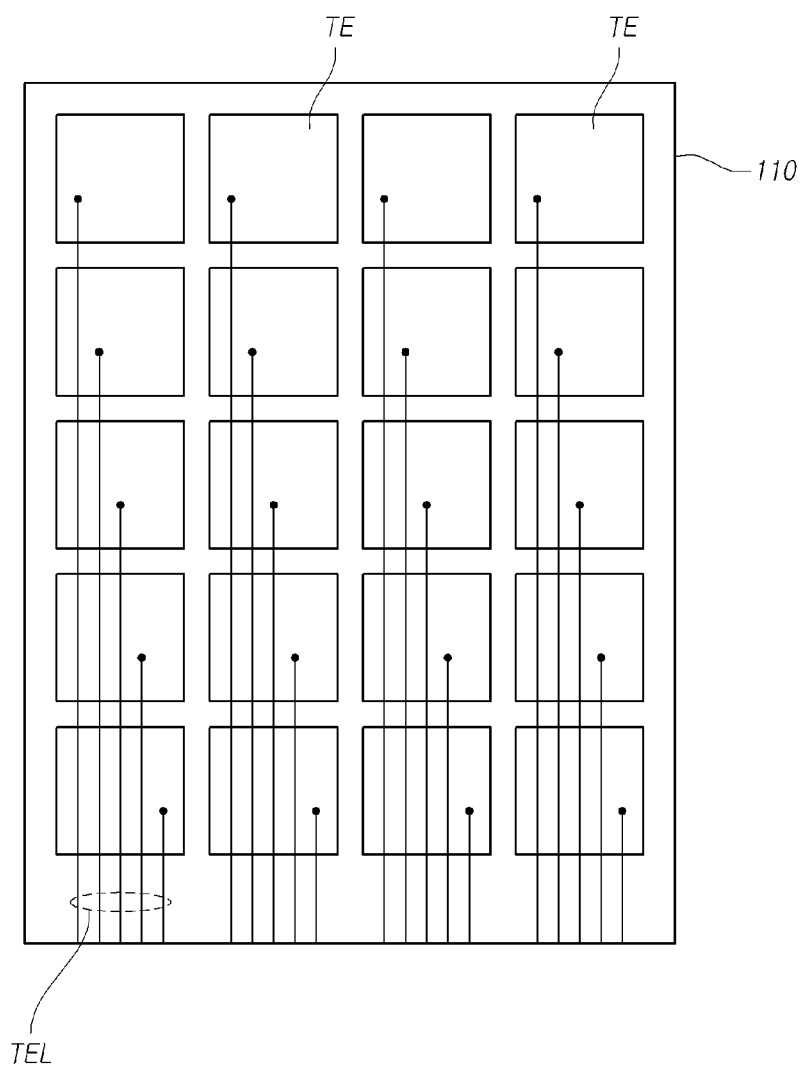
FIG. 5 is a plan view illustrating a touch sensor unit which is employed by the touch display device according to the embodiments of the present disclosure.

FIG. 5 is a plan view illustrating a touch sensor unit which is employed by the display device according to the embodiments of the present disclosure.

Referring to FIG. 5, the touch electrodes include a plurality of touch electrodes TE. The plurality of touch electrodes TE are disposed on the display panel 110, and the plurality of touch electrodes TE having a predetermined area are arranged in a 5×4 matrix on the display panel 110, but the present disclosure is not limited thereto. Each touch electrode TE is connected to a touch line TEL. Each touch line TEL is disposed under or above the touch electrodes TE and is in contact with one area of the touch electrodes TE. The touch lines TEL supply a touch driving signal to the touch electrodes TE and is supplied with a touch sensing signal from the touch electrodes TE. The touch driving signal and the touch sensing signal are referred to as touch signals. Since the touch electrodes TE and the touch lines TEL are mounted in the display panel 110 and the touch display device 100 does not include a separate touch panel on the display panel 110, a decrease in thickness of the display panel 110 can be achieved.

Figure 6:
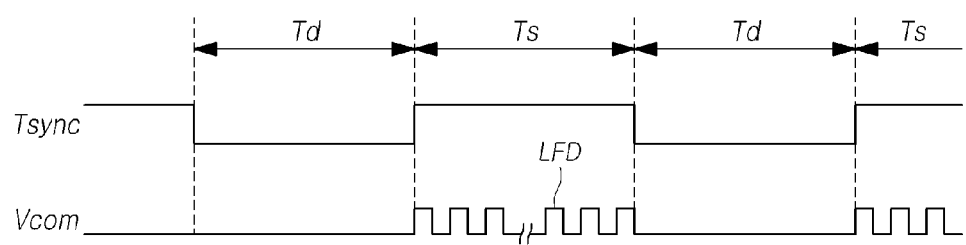
FIG. 6 is a timing diagram illustrating driving of the touch display device according to the embodiments of the present disclosure.

FIG. 6 is a timing diagram illustrating driving of the touch display device according to the embodiments of the present disclosure.

Referring to FIG. 6, the touch display device 100 can operate separately in a display period Td and a touch period Ts. In the display period Td, each subpixel 101 in the touch display device 100 can be supplied with a data signal and emit light. The touch display device 100 can operate separately in the display period Td and the touch period Ts depending on a touch synchronization signal Tsync. The touch display device 100 operates in the display period Td when the touch synchronization signal Tsync is in a low state, and operates in the touch period Ts when the touch synchronization signal Tsync is in a high state.

In the touch display device 100, the cathode electrode illustrated in FIG. 2 or the common electrode illustrated in FIG. 3 can be supplied with a DC (direct current) voltage with a predetermined voltage level in the display period Td. The touch display device 100 supplies a driving current on the basis of voltages supplied to the cathode electrode and the anode electrode to display an image or displays an image on the basis of the DC voltage supplied to the common electrode and a data voltage Vdata supplied to the anode electrode.

In the touch display device 100, the cathode electrode illustrated in FIG. 2 or the common electrode illustrated in FIG. 3 can be supplied with a load-free driving signal in the touch period Ts. In the touch display device 100, some touch lines out of the plurality of touch lines TEL are supplied with a touch driving signal and the other touch lines are supplied with a load-free driving signal synchronized with the touch driving signal. Accordingly, it is possible to prevent parasitic capacitance from being generated due to a difference in signal between some touch lines supplied with the touch driving signal and the other touch lines not supplied with the touch driving signal. Accordingly, it is possible to reduce power consumption of the touch display device 100, to reduce an influence of noise or the like, and thus to more accurately detect a touch sensing signal.

The display period Td and the touch period Ts are illustrated to have the same length, but the present disclosure is not limited thereto. The touch period Ts can be a blank period. The blank period can be one of a vertical blank period and a horizontal blank period. However, the present disclosure is not limited thereto. Since the touch driving signal which is supplied to the touch electrodes to sense a touch has the same phase and amplitude as a load-free driving signal which is supplied to the other touch electrodes to not be sensed, both signals can be signals which are not distinguished from each other. Accordingly, in the following description, the touch driving signal and the load-free driving signal are collectively referred to as load-free driving signals.

Figure 7:
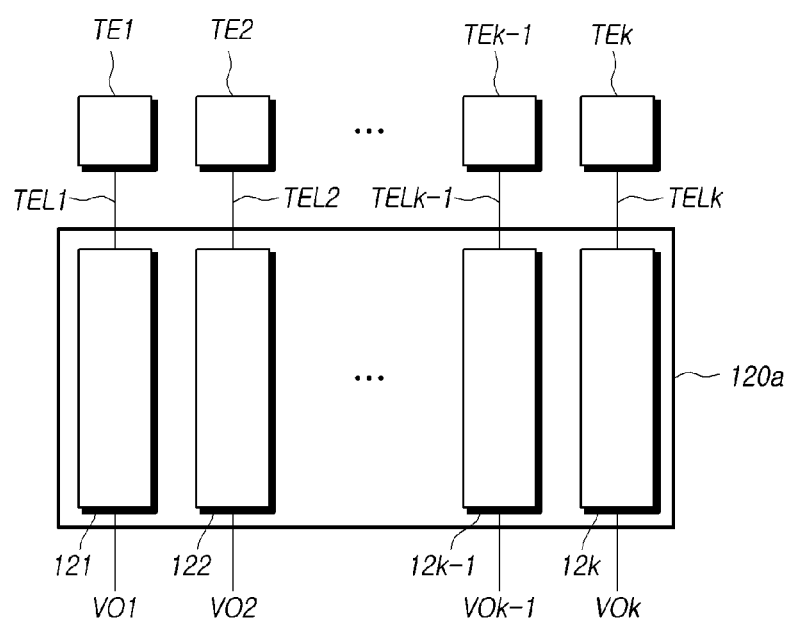
FIG. 7 is a conceptual diagram illustrating a connection relationship between touch electrodes and touch circuits according to the embodiments of the present disclosure.

FIG. 7 is a conceptual diagram illustrating a connection relationship between touch electrodes and touch circuits according to the embodiments of the present disclosure.

Referring to FIG. 7, a plurality of touch electrodes TE1, TE2, . . . , TEk−1, and TEk are connected to a touch circuit unit 120a via touch lines TEL1, TEL2, . . . , TELk−1, and TELk, respectively. More specifically, the touch circuit unit 120a includes a plurality of touch circuits 121, 122, . . . , 12k−1, and 12k. The plurality of touch electrodes TE1, TE2, . . . , TEk−1, and TEk are connected to the plurality of touch circuits 121, 122, . . . , 12k−1, and 12k, respectively. The plurality of touch circuits 121, 122, . . . , 12k−1, and 12k are connected to a plurality of output terminals VO1, VO2, . . . , VOk−1, and VOk. The plurality of output terminals VO1, VO2, . . . , VOk−1, and VOk are connected to touch lines. The touch lines refers to lines that connect a touch control circuit of the controller 150 to the plurality of output terminals VO1, VO2, . . . , VOk−1, and VOk.

One touch electrode is illustrated to be connected to one touch circuit, but the present disclosure is not limited thereto. For example, a plurality of touch electrodes can be connected to one touch circuit via a MUX (multiplexer).

The plurality of touch circuits 121, 122, . . . , 12k−1, and 12k are supplied with a load-free driving signal and supply the load-free driving signal to the plurality of touch electrodes TE1, TE2, . . . , TEk−1, and TEk. The plurality of touch circuits 121, 122, . . . , 12k−1, and 12k sense a touch using the supplied load-free driving signal and the load-free driving signal supplied to the plurality of touch electrodes TE1, TE2, . . . , TEk−1, and TEk. Sensing of a touch can be detection of touch strength and coordinates of a touch point, but the present disclosure is not limited thereto.

Figure 8:
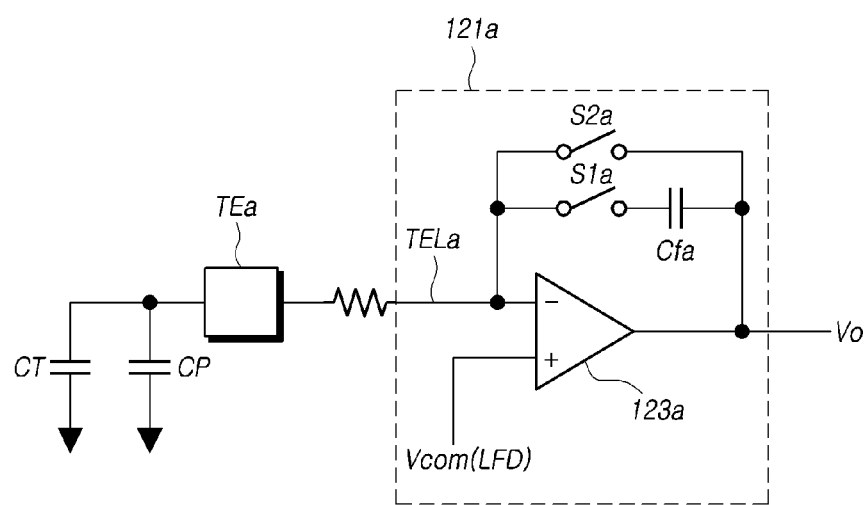
FIG. 8 is a circuit diagram illustrating a first example of the connection relationship between a touch circuit and a touch electrode which is illustrated in FIG. 7.
Figure 9:
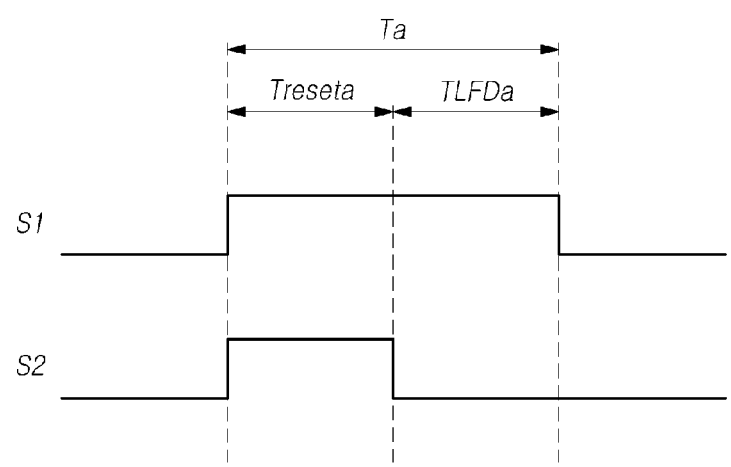
FIG. 9 is a timing diagram illustrating an operation of the touch circuit illustrated in FIG. 8.

FIG. 8 is a circuit diagram illustrating a first example of the connection relationship between the touch circuits and the touch electrodes which is illustrated in FIG. 7. FIG. 9 is a timing diagram illustrating the operation of the touch circuit illustrated in FIG. 8.

Referring to FIG. 8, a touch circuit 121a is connected to a touch electrode TEa via a touch line TELa. Here, the touch electrode TEa and the touch line TELa can be one of the plurality of touch electrodes and one of the plurality of touch lines illustrated in FIG. 7, respectively.

A touch capacitor CT and a parasitic capacitor CP are connected to the touch electrode TEa. The touch capacitor CT can be capacitance which is generated in the touch electrode TEa by a touch, and the parasitic capacitor CP is parasitic capacitance which is formed in the touch electrode TEa. The present disclosure is not limited thereto. Voltages corresponding to the touch capacitor CT and the parasitic capacitor CP are supplied to the touch circuit 121a via the touch line TELa.

The touch circuit 121a includes an amplifier 123a, a feedback capacitor Cfa, a first switch S1a, and a second switch S2a. The amplifier 123a is supplied with a common voltage Vcom or a load-free driving signal LFD via a positive input terminal (+). The present disclosure is not limited thereto and the amplifier 123a can be supplied with a cathode voltage or a load-free driving signal LFD via the positive input terminal (+). The common voltage Vcom or the cathode voltage is supplied to the positive input terminal (+) of the amplifier 123a in the display period Td illustrated in FIG. 6, and the load-free driving signal LFD is supplied to the positive input terminal (+) of the amplifier 123a in the touch period Ts illustrated in FIG. 6. A negative input terminal (−) of the amplifier 123a is connected to the touch line TELa and is supplied with a current which flows in the touch line TELa.

The first switch S1a and the feedback capacitor Cfa are connected in series to each other and are disposed between an output terminal Vo and a negative input terminal (−) of the amplifier 123a. The second switch S2a is disposed between the output terminal Vo and the negative input terminal (−) and is connected in parallel to the first switch S1a and the feedback capacitor Cfa.

Referring to FIG. 9, a touch circuit operation period Ta includes a reset period Treseta and a touch driving period TLFDa. The present disclosure is not limited thereto. The reset period Treseta can be included in the display period Td illustrated in FIG. 6, and the touch driving period TLFDa can be a period corresponding to the touch period Ts illustrated in FIG. 6. The present disclosure is not limited thereto.

In the reset period Treseta, the feedback capacitor Cfa is reset. In the reset period Treseta, the first switch S1a and the second switch S2a are turned on by being supplied with signals S1 and S2 in a high state. When the first switch S1a and the second switch S2a are turned on, the first electrode and the second electrode of the feedback capacitor Cfa have the same voltage and thus the feedback capacitor Cfa is reset.

In the touch driving period TLFDa, the first switch S1a is supplied with a signal S1 in a high state and is kept in an ON state, and the second switch S2a is supplied with a signal S2 in a low state and is turned off. When the first switch S1a is turned on, the load-free driving signal LFD is supplied via the positive input terminal (+) of the amplifier 123a. The amplifier 123a supplies the load-free driving signal LFD supplied via the positive input terminal (+) to the touch electrode TEa via the negative input terminal (−).

The amplifier 123a outputs a touch signal to the output terminal Vo on the basis of change in capacitance generated in the touch electrode TEa by comparing the load-free driving signal LFD supplied via the positive input terminal (+) with the load-free driving signal LFD supplied to the touch electrode TEa and storing a predetermined voltage in the feedback capacitor Cfa on the basis of the comparison result. That is, the amplifier 123a calculates the changes in voltage charged in the touch capacitor CT and the parasitic capacitor CP of the touch electrode TEa which is generated by a touch and outputs a touch signal.

Figure 10:
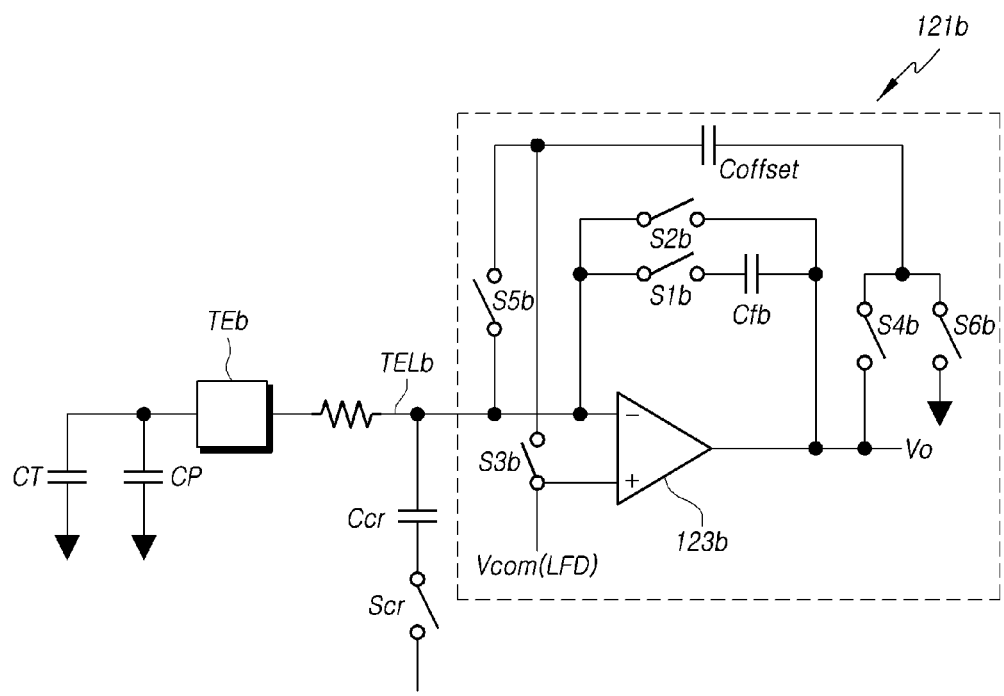
FIG. 10 is a circuit diagram illustrating a second example of the connection relationship between a touch circuit and a touch electrode which is illustrated in FIG. 7.
Figure 11:
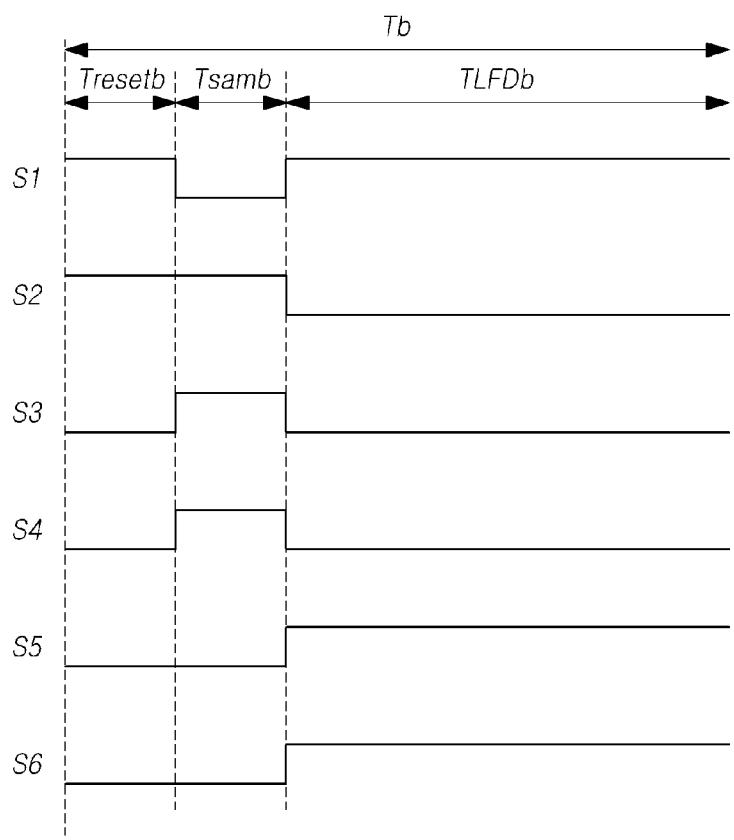
FIG. 11 is a timing diagram illustrating an operation of the touch circuit illustrated in FIG. 10.

FIG. 10 is a circuit diagram illustrating a second example of the connection relationship between the touch circuit and the touch electrode illustrated in FIG. 7. FIG. 11 is a timing diagram illustrating the operation of a touch circuit illustrated in FIG. 10.

Referring to FIG. 10, a touch circuit 121b stores an offset voltage thereof, is supplied with a load-free driving signal from a touch electrode, corrects the load-free driving signal on the basis of the offset voltage, and outputs the corrected load-free driving signal. The touch circuit 121b senses the offset voltage before storing the offset voltage. The touch circuit 121b senses the offset voltage by comparing an input voltage with a predetermined DC voltage level which is input to the touch circuit 121b with an output voltage which is output from the touch circuit 121b in response to the input voltage.

The touch circuit 121b generates the output voltage in response to the input voltage and includes a comparator that compares the input voltage with the output voltage, a storage unit that stores the offset voltage based on the voltage difference between the input voltage and the output voltage which is output from the comparator, and a switch unit that corrects the input voltage on the basis of the offset voltage stored in the storage unit. The touch circuit 121b is connected to a touch electrode TEb via a touch line TELb. Here, the touch electrode TEb and the touch line TELb can be one of the touch electrodes TE1, TE2, . . . , TEk−1, and TEk and one of the touch lines TEL1, TEL2, . . . , TELk−1, and TELk illustrated in FIG. 7, respectively.

The comparator includes an amplifier 123b of which a positive input terminal (+) is supplied with a predetermined voltage, a negative input terminal (−) is connected to the touch electrode TEb, and an output terminal Vo is connected to the negative input terminal (−), and a first capacitor Cfb and a first switch S1b that are disposed between the negative input terminal (−) and the output terminal Vo and are connected in series to each other. The comparator includes a second switch S2b that resets the first capacitor Cfb. When the first switch S1b and the second switch S2b are turned on, the voltages at both ends of the first capacitor Cfb are the same and thus the first capacitor Cfb is reset.

The amplifier 123b is supplied with a common voltage Vcom or a load-free driving signal LFD via the positive input terminal (+). The present disclosure is not limited thereto and the amplifier 123b can be supplied with a cathode voltage or a load-free driving signal LFD via the positive input terminal (+). The common voltage Vcom or the cathode voltage is supplied in the display period Td illustrated in FIG. 6, and the load-free driving signal LFD is supplied in the touch period Ts illustrated in FIG. 6.

The negative input terminal (−) of the amplifier 123b is connected to the touch line TELb and is supplied with a current which flows in the touch line TELb. The amplifier 123b includes a plurality of elements and a voltage output therefor deviates depending on characteristics of the elements. The deviation of the voltage which is output is referred to as an offset voltage. Accordingly, even when the plurality of touch circuits illustrated in FIG. 7 are supplied with the same load-free driving signal LFD via the plurality of touch lines TEL1, TEL2, . . . , TELk−1, and TELk, signals which are output from the plurality of touch circuit deviate due to the offset voltage of the amplifier 123b. Accordingly, there is a problem in that a deviation occurs in sensing a touch and the touch cannot be accurately detected.

In order to solve or address the above-mentioned problem/limitation, the touch circuit 121b includes a storage unit that stores an offset voltage and a switch unit that is connected between the storage unit and the comparator and corrects the offset voltage using the stored offset voltage. The storage unit includes a second capacitor Coffset. The switch unit includes third to sixth switches S3b to S6b. The present disclosure is not limited thereto.

The offset voltage of the amplifier 123b can be corrected by connecting the amplifier 123b to the second capacitor Coffset, storing the offset voltage in the second capacitor Coffset through operations of the third to sixth switches S3b to S6b, and then removing a deviation of a load-free driving signal supplied to the touch electrode using the offset voltage. When the offset voltage is corrected, the problem with the deviation in sensing a touch can be solved and the touch sensor 120 can achieve more accurate sensing of a touch. The touch sensor 120 can accurately detect a touch. When the touch sensor 120 can more accurately calculate strength and a position of a touch input, various application programs such as drawing which are driven in the touch display device 100 can use more accurate touch results.

The switch unit includes the third switch S3b that is disposed between the positive input terminal (+) of the amplifier 123b and the first electrode of the second capacitor Coffset, the fourth switch S4b that is disposed between the output terminal Vo of the amplifier 123b and the second electrode of the second capacitor Coffset, the fifth switch S5b that is disposed between the negative input terminal (−) of the amplifier 123b and the first electrode of the second capacitor Coffset, and the sixth switch S6b that is disposed between the second electrode of the second capacitor Coffset and the ground.

The first capacitor Cfb and the second capacitor Coffset are disposed in parallel between the output terminal Vo and the negative input terminal (−) of the amplifier 123b. The third switch S3b is disposed between the positive input terminal (+) and the negative input terminal (−) of the amplifier 123b and connects the positive input terminal (+) and the negative input terminal (−) of the amplifier 123b.

A charged voltage removing circuit is disposed in the touch line TELb connected to the touch circuit 121b. The charged voltage removing circuit includes a charged voltage removing capacitor Ccr and a charged voltage removing switch Scr. When the voltage charged in the touch line TELb is excessively high, the touch circuit 121b and/or the touch electrode TEb can be damaged and the charged voltage removing circuit discharges the touch line TELb to lower the voltage charged in the touch line TELb. When the charged voltage removing switch Scr of the charged voltage removing circuit is turned on, the charged voltage removing capacitor Ccr is turned on to discharge the voltage charged in the touch line TELb. The charged voltage removing circuit can also be applied to the touch circuit 121a illustrated in FIG. 8.

Referring to FIG. 11, a touch circuit driving period Tb includes a reset period Tresetb, a sampling period Tsamb, and a touch driving period TLFDb. The reset period Tresetb and the sampling period Tsamb are included in the display period Td illustrated in FIG. 6, and the touch driving period TLFDb is included in the touch period Ts illustrated in FIG. 6. The present disclosure is not limited thereto.

In the reset period Tresetb, the first capacitor Cfb is reset. In the sampling period Tsamb, the second capacitor Coffset senses the offset voltage of the amplifier 123b and stores the sensed offset voltage. In the touch driving period TLFDb, a deviation based on the offset voltage of the amplifier 123b is removed from the load-free driving signal LFD such that the offset voltage corresponds to the load-free driving signal LFD and the resultant signal is output. In the reset period Tresetb and the sampling period Tsamb, the positive input terminal (+) of the amplifier 123b is supplied with a DC voltage of a predetermined voltage level. The predetermined DC voltage can correspond to the common voltage Vcom or the cathode voltage which is supplied in the display period Td illustrated in FIG. 6. The present disclosure is not limited thereto.

In the reset period Tresetb, the first switch S1b and the second switch S2b are supplied with signals S1 and S2 in a high state and are turned on. The third to sixth switches S3b to S6b are supplied with signals S3 and S4 in a low state and are turned off. When the first switch S1b and the second switch S2b are turned on supplied with the high states signal, the first electrode and the second electrode of the first capacitor Cfb have the same voltage and thus the first capacitor Cfb is reset.

In the sampling period Tsamb, the first switch S1b is supplied with a signal S1 in the low state, and the second to fourth switches S2b to S4b are supplied with signals S2, S3, and S4 in the high state. The fifth switch S5b and the sixth switch S6b are supplied with signals S5 and S6 in the low state. Accordingly, the first switch S1b, the fifth switch S5b, and the sixth switch S6b are turned off, and the second to fourth switches S2b to S4b are turned on. When the first switch S1b is turned off, the first electrode of the first capacitor Cfb enters a floating state. When the second switch S2b is turned on, the output terminal Vo and the negative input terminal (−) of the amplifier 123b are connected to each other.

When the third switch S3b is turned on, the positive input terminal (+) of the amplifier 123b is connected to the first electrode of the second capacitor Coffset. When the fourth switch S4b is turned on, the output terminal Vo of the amplifier 123b is connected to the second electrode of the second capacitor Coffset. When the output terminal Vo and the negative input terminal (−) of the amplifier 123b are connected to each other and the positive input terminal (+) of the amplifier 123b is supplied with a predetermined voltage, the voltage level of the output terminal Vo of the amplifier 123b has to be equal to the voltage level of the positive input terminal (+) of the amplifier 123b.

However, a difference in voltage level between the output terminal Vo of the amplifier 123b and the positive input terminal (+) of the amplifier 123b can occur due to the offset voltage of the amplifier 123b. For example, the voltage level of the output terminal Vo of the amplifier 123b can be a value obtained by adding the voltage level of the offset voltage to the voltage level of the positive input terminal (+) of the amplifier 123b. The second capacitor Coffset is disposed between the output terminal Vo of the amplifier 123b and the positive input terminal (+) of the amplifier 123b and thus the offset voltage is stored in the second capacitor Coffset.

In the touch driving period TLFDb, the first switch S1b is supplied with a signal S1 in the high state and is maintained in the ON state, and the second to fourth switches S2b and S4b are supplied with signals S2, S3, and S4 in the low state and are turned off. The fifth switch S5b and the sixth switch S6b are supplied with signals S5 and S6 in the high state and are turned on. When the first switch S1b is turned on, the load-free driving signal LFD is supplied via the positive input terminal (+) of the amplifier 123b. The amplifier 123b supplies the load-free driving signal LFD, which is supplied via the positive input terminal (+), to the touch electrode TEb via the negative input terminal (−).

The amplifier 123b can output a signal corresponding to a voltage difference generated in the touch electrode TEb by comparing the load-free driving signal LFD input via the positive input terminal (+) with the load-free driving signal LFD supplied to the touch electrode TEb and storing a predetermined voltage in the first capacitor Cfb. That is, it is possible to calculate the change in voltage charged in the touch capacitor CT and the parasitic capacitor CP of the touch electrode TE which is caused by a touch.

Figure 12:
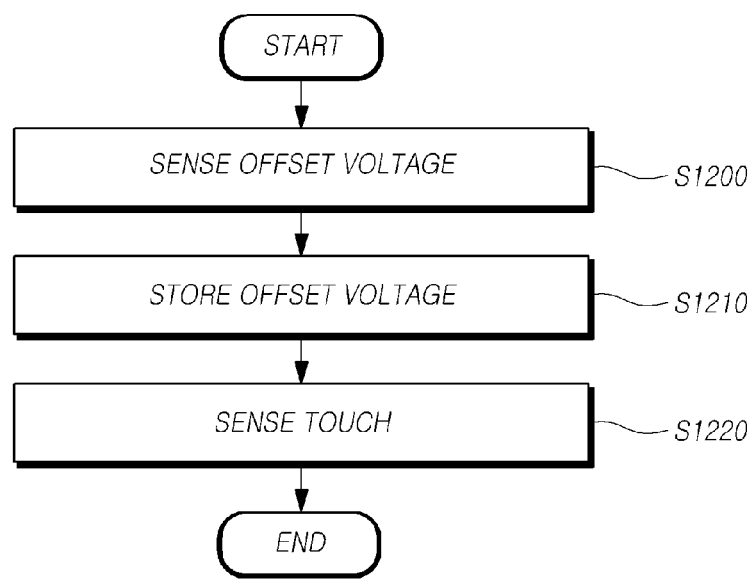
FIG. 12 is a flowchart illustrating an example of a method of driving the touch display device according to the embodiments of the present disclosure.

FIG. 12 is a flowchart illustrating an example of a method of driving the touch display device according to the embodiments of the present disclosure.

Referring to FIG. 12, in the method of driving the touch display device, first, an offset voltage of a touch circuit is sensed (S1200). In the touch display device, the touch circuits are connected to a plurality of touch lines connected to a plurality of touch electrodes. In the touch circuits, the offset voltage varies depending on element characteristics and the same touch sensing signal can vary depending on the offset voltage. In order to prevent the touch sensing signal from becoming inaccurate due to the variation, the offset voltage of the touch circuit is sensed. When the touch circuit includes an amplifier and the output terminal and the negative input terminal of the amplifier are connected to each other in a state in which the positive input terminal of the amplifier is supplied with a predetermined DC voltage, a difference can occur between the voltage level of the positive input terminal of the amplifier and the voltage level of the output terminal of the amplifier depending on the offset voltage. By sensing this difference, the offset voltage can be sensed. The offset voltage can be sensed by comparing the input voltage with a predetermined DC voltage level with the output voltage output from the touch circuit.

The offset voltage of the touch circuit is stored (S1210). The offset voltage is stored in the touch circuit. The touch circuit includes an amplifier and stores the offset voltage by storing a voltage between the output terminal and the positive input terminal of the amplifier. The offset voltage is stored in a capacitor. The capacitor is disposed between the output terminal and the positive input terminal of the amplifier.

Then, a touch is sensed (S1220). After the touch circuit has been set to a state in which a touch can be sensed, the touch can be sensed by supplying a load-free driving signal to the touch electrode. The touch circuit can sense a touch by determining whether the voltage based on the load-free driving signal has changed due to a touch. Here, since a current flowing in the touch line depending on the touch electrode reflects the stored offset voltage, a deviation based on the offset voltage can be removed from the touch sensing signal.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A touch display device comprising:
    a display panel configured to display images;
    a plurality of touch electrodes that are provided in the display panel; and
    a plurality of touch circuits that are electrically connected to the plurality of touch electrodes and configured to be supplied with a load-free driving signal from a touch electrode among the plurality of touch electrodes,
    wherein each of the plurality of touch circuits is configured to store an offset voltage of the corresponding touch circuit, corrects the load-free driving signal based on the offset voltage, and outputs the corrected load-free driving signal,
    wherein each of the plurality of touch circuit includes;
    an amplifier including a positive input terminal supplied with a predetermined voltage, a negative input terminal electrically connected to a corresponding touch line, and an output terminal electrically connected to the corresponding touch line;
    a first switch and a first capacitor that are disposed between the negative input terminal and the output terminal of the amplifier; and
    a second capacitor connected in parallel to the first capacitor, and
    wherein the first switch and the first capacitor are connected in series to each other, and the second capacitor is configured to store a voltage between the output terminal of the amplifier and the positive input terminal of the amplifier.

2. The touch display device according to claim 1, wherein each of
    the plurality of touch circuits is configured to operate separately in a display period in which the offset voltage is stored and in a touch period in which the load-free driving signal is supplied and the load-free driving signal is output based on the offset voltage.

3. The touch display device according to claim 1, wherein each of the plurality of touch circuits further comprises:
    a second switch connected between the negative input terminal and the output terminal;
    a third switch disposed between the positive input terminal and the second capacitor;
    a fourth switch disposed between the output terminal and the second capacitor;
    a fifth switch disposed between the negative input terminal and the second capacitor; and
    a sixth switch disposed between the second capacitor and a ground.

4. The touch display device according to claim 1, wherein the positive input terminal of the amplifier is supplied with a DC voltage with a predetermined voltage level in a display period, and is supplied with the load-free driving signal in a touch period.

5. The touch display device according to claim 2, further comprising:
    a data driver configured to supply a data signal to the display panel;
    a gate driver configured to supply a gate signal to the display panel; and
    a controller configured to control the data driver and the gate driver,
    wherein the controller is configured to supply the data signal to the display panel in the display period, and output the load-free driving signal to the touch circuits in the touch period.

6. The touch display device according to claim 1, further comprising a charged voltage removing circuit configured to discharge a voltage charged in touch lines.

7. A touch circuit comprising:
    a comparator configured to generate an output voltage based on an input voltage and compare the input voltage with the output voltage;
    a storage unit configured to store an offset voltage which corresponds to a voltage difference between the input voltage and the output voltage output from the comparator; and
    a switch unit configured to correct the input voltage based on the offset voltage stored in the storage unit,
    wherein the comparator includes;
    an amplifier including a positive input terminal supplied with a predetermined voltage, a negative input terminal electrically connected to a corresponding touch line, and an output terminal electrically connected to the corresponding touch line; and
    a first switch and a first capacitor that are disposed between the negative input terminal and the output terminal of the amplifier, and
    wherein the first switch and the first capacitor are connected in series to each other.

8. The touch circuit according to claim 7, wherein the storage unit includes a second capacitor that stores a voltage between the output terminal of the amplifier and the positive input terminal of the amplifier.

9. The touch circuit according to claim 8, wherein the switch unit includes:
    a third switch disposed between the positive input terminal of the amplifier and the second capacitor;
    a fourth switch disposed between the output terminal of the amplifier and the second capacitor;
    a fifth switch disposed between the negative input terminal of the amplifier and the second capacitor; and
    a sixth switch disposed between the second capacitor and a ground.

10. The touch circuit according to claim 9, wherein the positive input terminal of the amplifier is supplied with a DC voltage of a predetermined voltage level in a display period, and is supplied with the load-free driving signal in a touch period.

11. The touch circuit according to claim 7, further comprising a charged voltage removing circuit configured to discharge a voltage charged in touch lines.

12. A method of driving a touch display device including a display panel, a plurality of touch electrodes arranged in the display panel, and a plurality of touch circuits that are connected to a plurality of touch lines and output a touch sensing signal thereto, the method comprising:
　　sensing an offset voltage of the plurality of touch circuits;
　　storing the sensed offset voltage in the plurality of touch circuits; and
　　sensing a touch and correcting charged voltages of the plurality of touch electrodes input to the plurality of touch circuits based on the stored offset voltage,
　　wherein each of the plurality of touch circuits includes;
　　a comparator that generates an output voltage based on an input voltage and compares the input voltage with the output voltage;
　　a storage unit that stores an offset voltage which corresponds to a voltage difference between the input voltage and the output voltage output from the comparator; and
　　a switch unit that corrects the input voltage based on the offset voltage stored in the storage unit,
　　wherein the comparator includes;
　　an amplifier including a positive input terminal supplied with a predetermined voltage, a negative input terminal connected to a corresponding touch line, and an output terminal connected to the corresponding touch line; and
　　a first switch and a first capacitor that are disposed between the negative input terminal and the output terminal of the amplifier, and
　　wherein the first switch and the first capacitor are connected in series to each other.

13. The method of driving a touch display device according to claim 12, wherein the offset voltage is sensed by comparing an input voltage with a predetermined DC voltage level with an output voltage which is output from the plurality of touch circuits in response to the input voltage.

* * * * *